United States Patent [19]

Schoenrock

[11] Patent Number: 5,156,736
[45] Date of Patent: Oct. 20, 1992

[54] SIMULATED MOVING BED APPARATUS USING A SINGLE SORBENT BED FOR SEPARATING COMPONENTS FROM A FLUID STREAM

[76] Inventor: Karlheinz W. R. Schoenrock, 5333 Fillmore, Ogden, Utah 84403

[21] Appl. No.: 696,515

[22] Filed: May 7, 1991

[51] Int. Cl.⁵ .................. B01D 15/02; B01D 24/28
[52] U.S. Cl. .................. 210/264; 127/46.1; 127/46.2; 210/143; 210/198.2; 210/283; 210/659; 210/662; 210/676
[58] Field of Search ............... 210/659, 662, 676, 678, 210/198.2, 137, 143, 264, 96.1, 167, 283, 284, 285, 289, 290, 291, 519, 521, 661, 807; 127/46.1, 46.2

[56] References Cited

U.S. PATENT DOCUMENTS

| | | | |
|---|---|---|---|
| 2,985,589 | 5/1961 | Broughton et al. | 210/676 |
| 3,268,605 | 8/1966 | Boyd, Jr. | 210/676 |
| 4,157,267 | 6/1979 | Odawara et al. | 210/652 |
| 4,182,633 | 1/1980 | Ishikawa et al. | 210/198.2 |
| 4,267,054 | 5/1981 | Yoritomi et al. | 210/659 |
| 4,319,929 | 3/1982 | Fickel | 210/692 |
| 4,379,751 | 4/1983 | Yoritomi et al. | 210/659 |
| 4,404,037 | 9/1983 | Broughton | 127/46.2 |
| 4,405,455 | 9/1983 | Ando et al. | 210/284 |
| 4,409,033 | 10/1983 | LeRoy | 127/46.2 |
| 4,412,866 | 11/1983 | Schoenrock et al. | 210/656 |
| 4,519,845 | 5/1985 | Ou | 127/46.2 |
| 4,521,252 | 6/1985 | Miyake et al. | 127/46.2 |
| 4,523,959 | 6/1985 | Exertier | 127/46.2 |
| 4,599,115 | 7/1986 | Ando et al. | 210/656 |
| 4,837,315 | 6/1989 | Kulprathipanja | 127/46.1 |

*Primary Examiner*—Robert A. Dawson
*Assistant Examiner*—Sun Uk Kim
*Attorney, Agent, or Firm*—J. Winslow Young

[57] ABSTRACT

An apparatus and process for concentrating a selected component from a multi-component liquid using a sorbent bed having a preferential sorption rate for the selected component. The sorbent bed is enclosed in a single vessel and is operated in a simulated moving bed technique whereby the flow profile of the liquid is continually moved downwardly through the sorbent bed. Recirculation is continuous but variable and is accompanied by the injection of eluent and feedstock and the removal of extract and raffinate at preselected times, locations, and amounts as a function of the kinetics and voidage of the sorbent bed. Extract purity and operational efficiency of the sorbent bed are the result of this novel apparatus and process.

22 Claims, 4 Drawing Sheets

SIMULATED MOVING BED APPARATUS USING A SINGLE SORBENT BED FOR SEPARATING COMPONENTS FROM A FLUID STREAM

BACKGROUND

1. Field of the Invention

This invention relates to processes for selectively separating a mixture of components through sorption and desorption and, more particularly to a novel simulated moving bed apparatus and method whereby the simulated moving bed is created within an uninterrupted sorbent bed by imbedding strategically within such sorbent bed multiple distributors for injection of feedstock and eluent along with multiple collectors for removal of extract and raffinate and to obtain narrower fraction cuts by reducing the time for injecting feedstock and eluent and collecting separated fractions respectively without stopping the percolation of circulating fluid through the sorbent bed which results in significantly reduced bed compaction and flow restriction.

2. The Prior Art

The commercial application of column chromatography for the separation of dissolved constituents using suitable sorbents and batch operation has evolved over the years to a level as represented by Yoritomi et al (U.S. Pat. Nos. 4,379,751 and 4,267,054). To achieve a reasonable level of separation the sorbent beds in these systems must be relatively tall. Yoritomi specifies at least 10 meters. At such high bed depths the flow rates through the bed must be relatively low to avoid progressive bed compaction and eventual total blockage to flow. These necessary low flow rates restrict operating capacities which could potentially be available from state of the art, high kinetic separating mediums. The stop and go operation of a batch process as represented by U.S. Pat. No. 4,379,751 also leaves a large part of the separating medium idle in certain parts of the column while feedstock and eluent are added to the column or extract and raffinate fractions are withdrawn. Additionally, the total removal of certain concentration bands from the column liquid as practiced by U.S. Pat. No. 4,379,751 imposes rather sudden changes of concentration gradients which impairs general operating efficiency in terms of osmotic shock on the resin and the need to re-establish this concentration band in subsequent cycles which retards the speed of operation. These impediments have all but eliminated the batch process from consideration for commercial application in column chromatography.

The invention of the so-called simulated moving bed process by Broughton et al (U.S. Pat. No. 2,985,589) improves on the batch operation in its most sophisticated form by providing for the continuous circulation of fluids through multiple beds of sorbents. The sorbent beds are arranged as an endless loop with periodic advances to the next sorbent bed within the loop for inlet flows of feedstock and eluent and outlet flows of effluent fractions, respectively. This operation is also referred to as a pseudo moving bed process. One form of commercialization of this process includes discrete multiple sorbent beds vertically stacked on top of each other in the form of a tower as initially proposed by the foregoing reference as well as those of Ishikawa et al (U.S. Pat. No. 4,182,633); Odawara et al (U.S. Pat. No. 4,157,267); Ando et al (U.S. Pat. No. 4,405,455). Another approach is the use of multiple individual columns horizontally arranged as a train with the train operated as an independent closed loop and is taught by Schoenrock et al (U.S. Pat. No. 4,412,866) and Ando et a (U.S. Pat. No. 4,599,115). In the commercial separation of dissolved constituents by chromatography such a the fractionation of fructose from dextrose or the separation of sucrose from highly impure sugar solution such as molasses by ionic exclusion using the so-called simulated moving bed technique, it becomes necessary to establish and maintain a very specific concentration profile. This concentration profile is distributed, as a rule, over four or more sorbent beds as taught by the foregoing references to aid in optimizing the introduction and withdrawal of streams at strategic positions of the closed loop.

One or more of these sorbent beds within the endless loop is projected to represent a specific zone which in their most fundamental form are referred to as sorption, displacement, elution and rinse zones, respectively. Continuous circulation of the loop fluid around this endless loop train causes each of the zones to be periodically shifted to the sorbent bed next in line downstream. The objective is t maintain a steady state concentration profile which moves as a wave continuously around the looped train while introducing feedstock and eluent to the train at strategic locations and removing separated fractions from the circulation fluid thereby establishing a continuum.

General performance efficiency and steady state operation of the process depend primarily upon the following factors:

1. Accurate control of the correct circulating flow to maintain a steady state profile through the entire loop.
2. Correct selection of influent and effluent cuts.
3. Uniform cross sectional distribution and drainage of fluids entering and leaving the beds, respectively.
4. Uniform cross sectional, downward movement of the circulation fluid through the sorbent beds with avoidance of channeling or net lateral flow.
5. Distinction between hydraulic balance and internally generated pressure through the circulation pumps and separate control for each pressure function.

Conventionally the determination and control of the circulation flow rate remains generally undefined and left to speculation or experimentation. The patent of Schoenrock et al refers to a total liquid displacement volume as being given to provide the basis for establishing the circulation flow rate without defining the meaning of that terminology or how one arrives at that value. Other patents are mute on this point and leave the impression that this value is derived through trial and error. Although the teachings of U.S. Pat. No. 4,412,866 are very specific for correcting a given basic circulation flow rate with measured inflow and outflow rates, experience has shown that these corrections are not accurate and ineffective if the basic circulation flow rate is not accurately know.. The foregoing problems reduce the operating efficiency and the need for periodic manual corrections of the circulation flow rate. Because of its dynamic nature the pseudo-moving bed operation of the known prior art generates a continuously changing concentration profile of the dissolved components in the fluid percolating through the sorbent beds in terms of absolute concentration as well as the relative concentration of the dissolved solutes to each other.

These systems also teach and practice a continuous inflow of feedstock and eluent and respective outflows of separated fractions throughout the complete cycle This constraint requires compromises for selecting the positions to introduce feedstock and eluent as well as for withdrawing effluent fractions. A constant feedstock and eluent composition is thus introduced into and spread over a continuously changing concentration profile in the circulation fluid while continuously changing effluent concentrations are withdrawn. Such a processing strategy compromises the background concentration profile. Continuous or frequent monitoring of these concentration profiles is therefore essential to bracket the target concentrations for inlet and outlet positions in pseudo-moving bed separator loops to approach optimum operating performance for the system. To overcome this impediment it is common practice to increase the number of sorbent beds within a sorbent bed train and thereby gain access to smaller changes in the concentration gradients and sharper separation. Hence, the generally held conviction that an increasing number of discrete sorbent beds in a sorbent bed train improves the separating efficiency for pseudo moving bed systems. However, multiple bed trains such as the tower trains require a relatively short bed depth of less than 1 meter for each of its vessels to manage an extremely high pressure drop associated with high flow velocities required by multiple bed trains and which are particularly observed in certain parts of such trains. This high pressure drop is as a rule isolated to those beds where high solids concentrations accumulate and where the sorbent medium expands due to the desorbent action. One option to reduce this restriction for large commercial plants is to increase the diameter of the column and reduce the bed depth for each sorbent bed in the sorbent bed train. It is, however, also generally recognized by experts that it becomes increasingly more difficult to maintain the required uniform cross-sectional distribution, uniform cross-sectional collection and uniform cross-sectional downward movement for fluids in pseudo-moving bed sorbent trains as the ratio of sorbent bed diameter to the sorbent particle size increases. Hence, separation performances deteriorate as a rule with increasing column diameter. Because of the recognized restrictions in sorbent bed diameter the need for multiple trains in large commercial installations is associated with greatly increased costs. All these aforementioned impediments are associated with reduced operating efficiency, greatly increased costs, increased control complexity and increased pressure drop restrictions. The various systems proposed and currently in use represent trial and error compromises deviating more or less from the ideal state for achieving the objectives referred to above.

I have now discovered the means to approach the ideal state of efficiency and performance at greatly reduced costs, reduced complexity of valving and reduced process control needs. Problems associated with the control of pressures are also virtually eliminated.

In view of the foregoing, it would be an advancement in the art to provide a novel, pseudo-moving bed apparatus in a single vessel having the capability to more efficiently utilize the sorption characteristics of the sorbent material in the sorbent bed. It would also be an advancement in the art to provide an apparatus and method for obtaining narrower fraction cuts through the more efficient utilization of the sorption characteristics of the sorption bed through a carefully controlled pseudo moving bed in the sorption bed. It would also be an advancement in the art to provide a sorbent bed with all of the zones for sorption and desorption of the desired constituent from the fluid stream contained in a single, continuous sorbent bed. Such a novel apparatus and method is disclosed and claimed herein.

BRIEF SUMMARY AND OBJECTS OF THE INVENTION

This invention relates to a novel apparatus and method for obtaining more efficient separation of constituents from a liquid stream through narrower fraction cuts from a simulated moving bed contained in a continuous, uninterrupted sorbent bed. A circulating liquid stream is continuously moved through the sorbent bed in an endless loop while carefully controlled amounts of feedstock and eluent are periodically introduced into the circulating liquid stream in coordination with the withdrawal of separated fractions from the circulating fluid as predetermined by the kinetics of the specific sorbent material. Multiple distributors and collectors provide for the ability to create a simulated moving bed within the single sorbent bed.

It is, therefore, the primary object of this invention to provide multiple distributors and collectors with uniform cross-sectional functionality imbedded in the sorbent material contained in a single, uninterrupted bed functionally operating as a simulated, moving bed to balance unavoidable expansion and contraction of sorbent material in the sorbent bed to prevent bed compaction.

Another object of this invention is to periodically inject feedstream and eluent in the shortest possible time into the continuously circulating loop fluid at strategic positions and in coordination with the withdrawal of separated fractions for maintaining hydraulic integrity within the loop to provide for narrower fraction cuts.

Another object of this invention is to maintain fixed positions for inlet and outlet streams of the loop. Another object of this invention is to alternate feed and eluent addition in coordination with respective withdrawal of separated fraction.

Another object of this invention is to add feedstream and eluent simultaneously to the circulating fluid of the simulated moving bed with uninterrupted, stationary sorbent bed, at fixed locations in coordination with the withdrawal of separated fractions from the circulating fluid.

Another object of this invention is to move addition and withdrawal positions along the length of the sorbent bed in coordination with the movement of the optimum concentration profile in the multiple zones within the circulating fluid flowing through the stationary sorbent bed.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENTS

Figure 1:
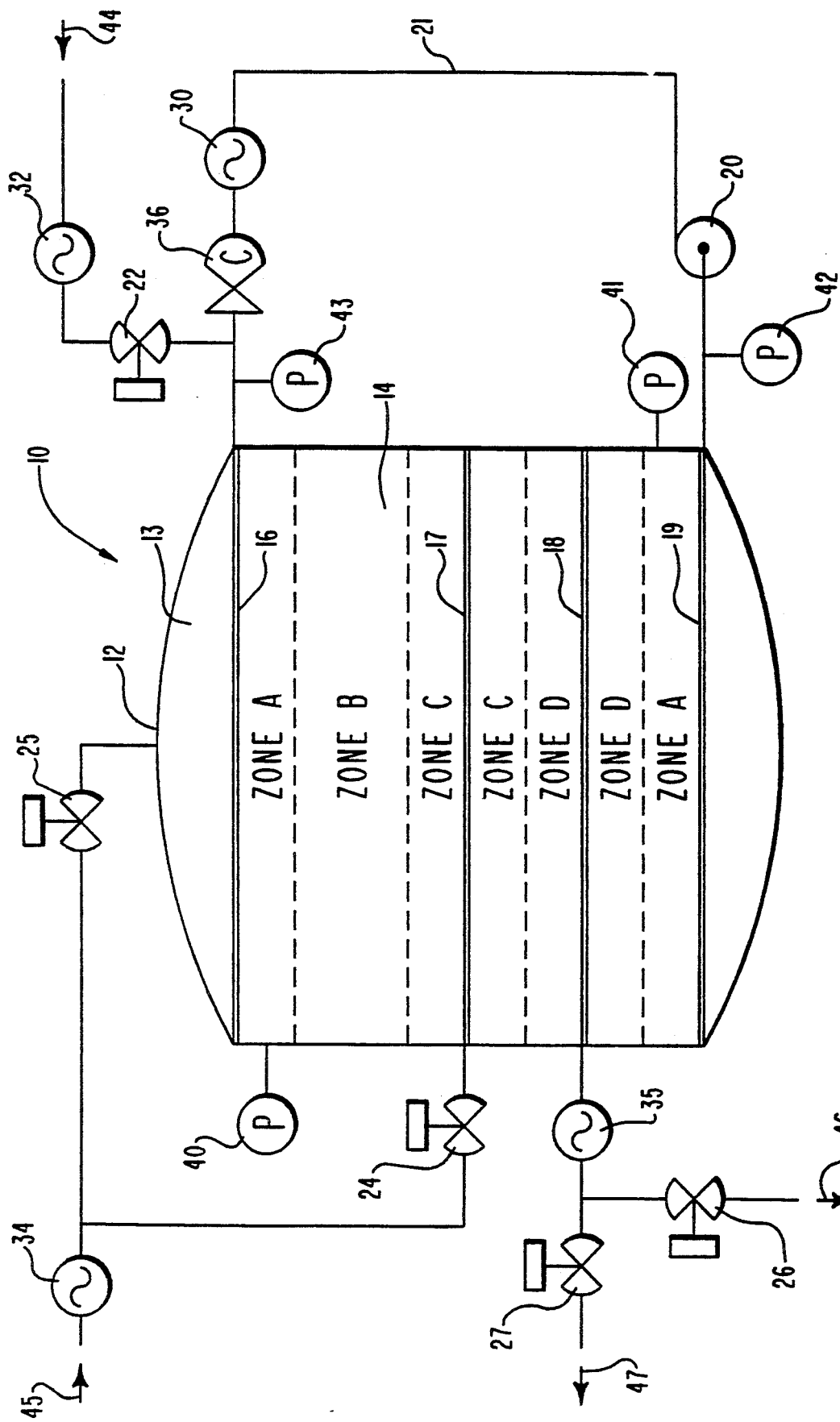
FIG. 1 is a schematic of a first preferred embodiment of the novel process of this invention.

The invention is best understood by the following description with reference to the drawings wherein like parts are designated by like numerals throughout.

General Discussion

Through careful observation I have discovered that improved operating performance of pseudo-moving bed processes with increasing number of sorbent beds is largely a result of narrower fraction cuts and increased frequency for collecting and redistributing the circulating fluid through a continuous multiple bed sorbent train with discrete sorption beds. This approach inhibits, through frequent cross-sectional drainage and redistribution, the possibility of progressive channeling and lateral flow which otherwise would distort the moving front and the profile. Such flow deviations occur when moving sorbent bed fluid through a continuous sorbent bed with a large diameter and without special provisions for uniform perpendicular flow, distribution and drainage respectively.

This invention comprises an improved pseudo-moving bed system wherein a continuous sorbent bed configured from a single, uninterrupted sorbent bed without the need for multiple beds in the form of discrete compartments or separate vessels. The sorbent bed is characterized in that it contains all concentration gradients within the circulating fluid of a pseudo-moving bed train.

The single column eliminates the problem of pressure drop found in sorbent beds where the discrete zones are isolated in separate vessels or compartments within the vessel. This I have found to be important because of the nature of the sorption process as it effects the physical characteristics of the sorbent material. In particular, during the sorption process the individual beads of sorbent material shrink in size while those beads of sorbent material undergoing desorption tend to swell. This latter swelling phenomena causes significant compaction in a sorbent bed confined in a single vessel or compartment with a corresponding reduction of flow rate through the sorbent bed. However, the sorbent bed of my invention is contained in a single vessel with the discrete zones able to freely communicate throughout the entire length of the sorbent bed. This is important since it eliminates the foregoing problem of compaction that would otherwise occur if the various zones in the sorbent bed of my invention were confined in separate compartments.

The circulating fluid is continuously moving without interruption through the sorbent bed from the top to the bottom and returned to the top of the sorbent bed by means of a circulating pump to form an endless loop. Collectors are located at strategic positions in the sorbent bed to uniformly introduce feedstock and/or eluent over the entire cross-sectional are of the sorbent bed. Collectors are also located at strategic locations to uniformly withdraw fractions containing separated components from the circulating fluid over the cross-sectional area of the sorbent bed. The introduction of feedstock and eluent to the circulating fluid and the withdrawal of respective fractions from the circulating fluid occur periodically within the shortest possible time whenever the relevant concentration gradient within the circulation fluid arrives at the respective distributors/collectors. Uniform perpendicular and downward movement of circulating fluid is maintained throughout the entire sorbent bed at predetermined, changeable flow rates. Only a portion of the circulating fluid containing the desired concentration gradient is periodically withdrawn at the preselected location. An equivalent volume of feedstock and/or eluent is added to the circulating fluid at the preselected locations while the remaining part of the circulating fluid (plus added feedstock and eluent after becoming part of the circulating fluid) continues its downward travel through the sorbent bed. The circulating fluid passes from top to bottom through the sorbent bed and back to the top to form an endless loop. This circulating fluid maintains a steady state, continuously moving fluid stream but with an unchanging yet dynamically moving concentration profile generated through the progressive and continuous sorption and desorption of sorbents. Collectors and distributors in this sorbent bed system are designed to achieve uniform, cross-sectional distribution of feedstock and eluent and collection of the respective fractions without removal of separating medium from the sorbent bed. These distributors/collectors may be operated in a static, fixed position for a dedicated function. Alternatively, they may be operated dynamically wherein they alternately function in each respective position for distribution or collection. The interior of the sorbent bed columns contain means to enforce uniform cross-sectional and perpendicular downflow without lateral movement for the circulating fluid. This new concept can also be applied to multiple sorbent bed trains in connection with chromatography, ion exclusion, ion exchange or any separation process requiring sorbent beds.

In studying the operational limitations of the pseudo-moving bed process I have also discovered the fundamental means for projecting an accurate basic circulation flow and for predicting and maintaining a steady state progressive movement of the four basic zones in a pseudo-moving sorbent bed. I found this to be based on the true liquid voidage between the solid sorbent particles in the noncompressible sorbent bed and the application of the specific kinetics for the sorbent medium. These values can be experimentally determined for each specific sorbent medium and column design. For spherical, uniform particles with a mean diameter of about 320 microns I have determined the voidage to be about 48% of the total sorbent bed volume in columns designed according to this invention and used in ion exclusion operations. I have also determined experimentally the basic kinetics of the sorbent required for predicting the movements of the various zones through a pseudo-moving sorbent bed to assure depletion of the circulation fluid from the sorbed substance and regeneration of the sorbent with the eluent. These functions are defined within the scope of this invention as:

a. The ability to retain a fixed quantity of the sorbed component. For the conditions used in this demonstration this value was 31 grams sucrose/liter sorbent medium.

b. The average rate of sorption from the blended mixture For the conditions in the examples given below it was to be 1.5 grams/liter sorbent/minute with a range between 0.5 to about 3.5 grams sucrose/minute/liter sorbent medium.

c. The average rate of desorption from the sorbent medium loaded with sucrose. The desorption rate for the sorbent medium and conditions in this demonstration it was to be 3.05 grams sucrose per minute per liter sorbent medium with a range between over 7 grams to under 1 grams sucrose/minute/liter sorbent medium. Desorption is primarily driven by concentration differences.

With this information it is now possible to project correctly the amount of loading per time unit and the maximum velocity of the circulation fluid during the sorption and desorption process in the sorbent bed to move the optimum concentration profile at steady state and in the proper time frame in front of respective distributors and collectors while keeping respective frontal zones separated from each other.

Detailed Description

FIG. 1 illustrates the essential components required for a first preferred embodiment of the simulated moving bed according to this invention shown generally at 10 and includes a column 12, having an eluent dome 13, a sorbent bed 14, a circulation distributor 16, a secondary distributor 17, an effluent collector 18, and a circulation collector 19. Also included are a circulation pump 20, a feedstock valve 22, eluent valves 24 and 25, an extract valve 26, a raffinate valve 27, a circulation flowmeter 30, feedstock flowmeter 32, eluent flowmeter 34, effluent flowmeter 35, check valve 36 and pressure sensors 40–43.

Special means for preventing lateral flow within the sorbent bed and for enforcing uniform distribution and collection are not shown.

FIG. 1 provides for the operation of distributors 16 and 17 along with collectors 18 and 19 in a static mode, each with a dedicated, single function of injection with alternate withdrawal of separated fractions. Sorbent bed 14 is operated as a pseudo-moving bed system within column 12 which is configured as a single column containing sorbent bed 14 as a continuous sorbent bed. The top of sorbent bed 14 may be confined either by a flat, horizontal enclosure of the column (not shown) or by a hydraulic dome or eluent dome 13 formed from the incoming eluent, eluent 45, which in turn is confined by the dished head of the column enclosure of eluent dome 13 as shown in FIG. 1. In the preferred, less costly latter case eluent 45 is added to the top of eluent dome 13 whenever the scheduled addition for eluent 45 at that position occurs. Eluent 45 hydraulically and uniformly pushes the underlying interface into the circulating fluid throughout the cross section of column 12. The circulating fluid is also continuously and uniformly injected through distributor 16 across the cross section of sorbent bed 14. When operating with a flat horizontal top enclosure (not shown) for sorbent bed 14, the top eluent injection through valve 25 would be adjacent to injection of feedstock 44.

Figure 2:
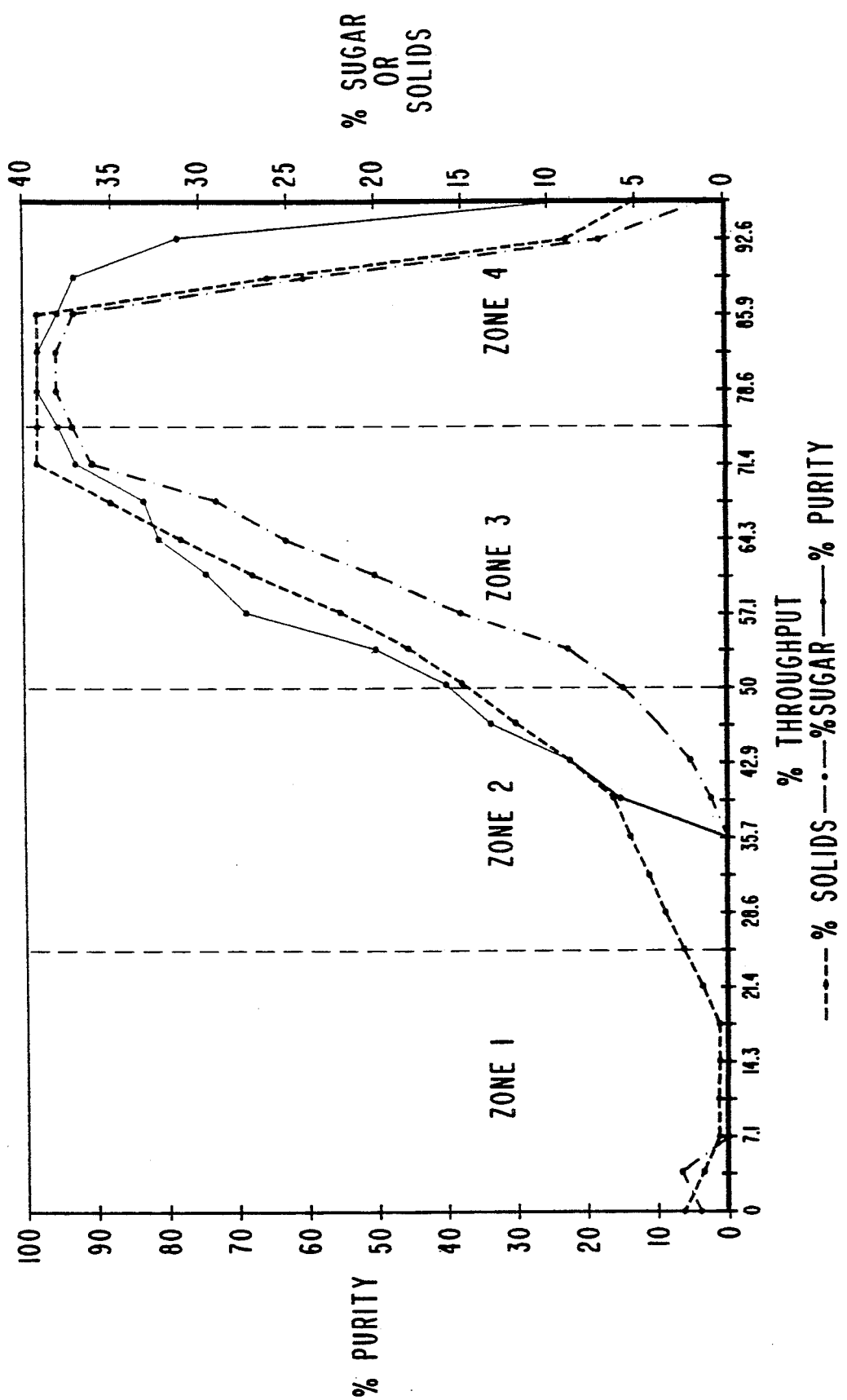
FIG. 2 is a chart of the circulation liquid profile through the apparatus and method of this invention.

FIG. 2 illustrates an optimum concentration profile throughout the circulation fluid in sorbent bed 14 (FIG. 1). This concentration profile is generated and maintained when operating at steady state according to this invention. With the lowest solids concentration in the circulation fluid represented by Zone A in FIG. 1 (at circulation distributor 16) eluent 45 is added to eluent dome 13 during a brief period while Zone D, representing the leading front of the nonsorbed components, is moving across collector 18. During this brief period of eluent 45 addition to the top of sorbent bed 14 the most favorable raffinate 47 fraction located in Zone D and containing the nonsorbed component is withdrawn through collector 18 and valve 27. At the same time Zone B contains the desorbed fraction and a concentration gradient equivalent to the feedstock is represented by Zone C. Circulation pump 20 is manipulated to move the concentration profile as illustrated in FIG. 2 without interruption around this endless loop in harmony with the brief periods of additions to and withdrawals from the endless loop while sorption and desorption i continuously proceeding in various parts of sorbent bed 14. This manipulation of the circulation pump 20 moves in due time the most favorable concentration for the desorbed component in Zone B in front of collector 18 while the feed stock 44 concentration profile arrives with Zone C at the circulation distributor 16 and the lowest total dissolved solids concentration in Zone A surrounds the secondary distributor 17. At that point and for the shortest possible time feedstock 44 is added through valve 22 to the circulation fluid in Zone C while the desorbed component, extract 46, is withdrawn through collector 18 and valve 26. Simultaneous with the withdrawal of extract 46 through collector 18 and valve 26 eluent 45 may be added through valve 24 and secondary distributor 17 to Zone A at a preselected rate to maintain the predetermined overall ratio of eluent 45 to feedstock 44 for a complete cycle along with the desired ratio of the separated fractions to each other for a complete cycle. The operation of pump 20 is continuous but variable to move circulating fluid through circulation circuit 21 at a predetermined but changeable rate through the sorbent bed 14 and to maintain a progressive concentration profile at steady state for a total utilization of all sorbent medium in sorbent bed 14 in harmony with the kinetic properties of the sorbent material.

Figure 3:
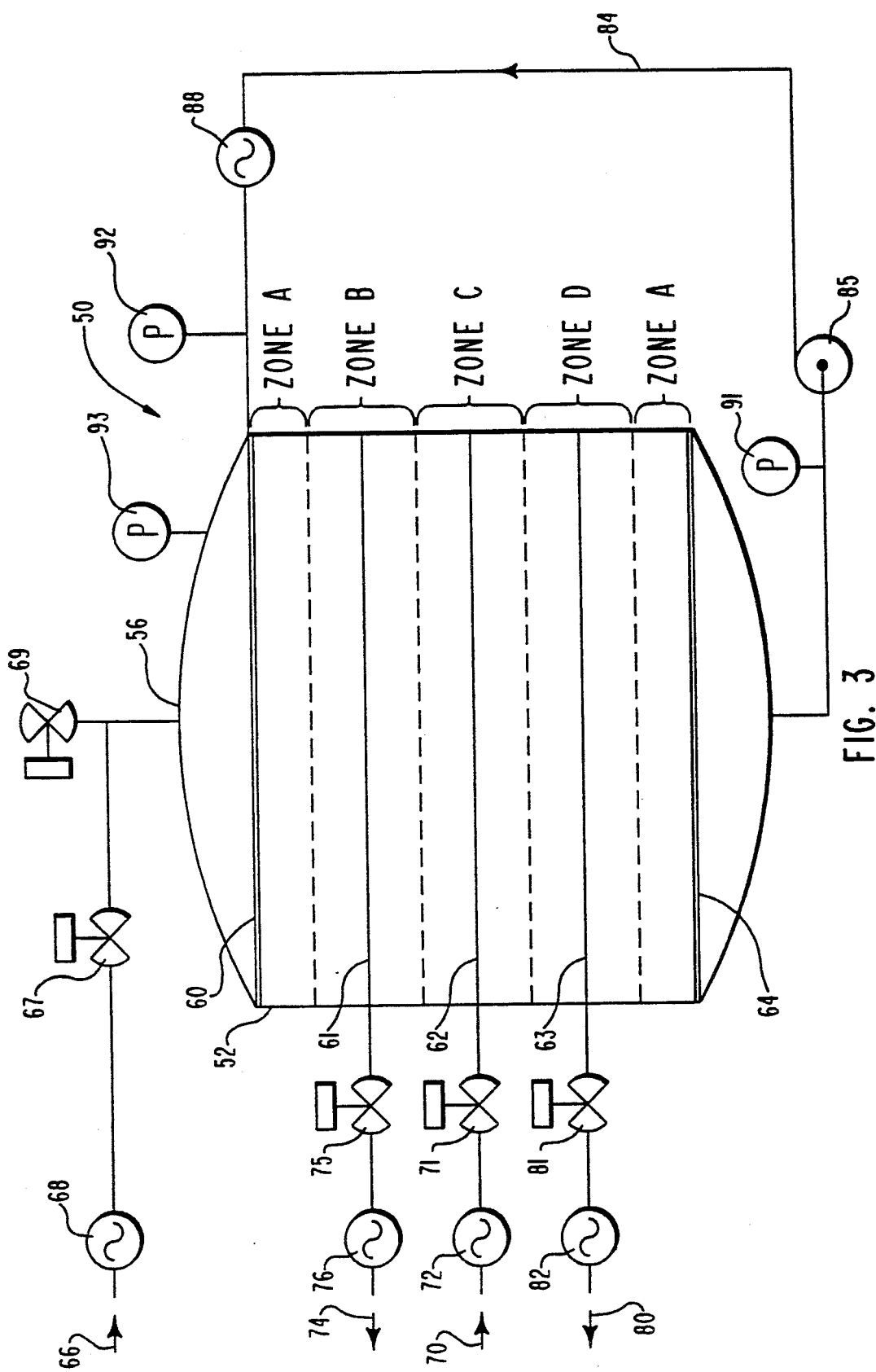
FIG. 3 is a schematic of a second preferred embodiment of the novel process of this invention.

FIG. 3 demonstrates the manifolding according to this invention for a single sorbent bed featuring dedicated operation of distributors/collectors but with simultaneous injection of feedstock and eluent to the circulation fluid for the shortest possible time while at the same time withdrawing separated fractions from the circulation fluid through dedicated collectors. The circulation flow is maintained uninterrupted but at a somewhat reduced rate during the short injection period. In its most basic form the configuration in FIG. 3 according to this invention is shown generally at 50 and includes a vessel 52 with a sorbent bed 54. The upper end of vessel 52 is configured with an eluent dome 56. Also included are an upper circulation distributor 60, extract collector 61, feedstock distributor 62, raffinate collector 63, recirculation collector 64, recirculation pump 85, eluent valve 67, extract valve 75, feedstock valve 71, raffinate valve 81, eluent flowmeter 68, extract flowmeter 76, feedstock flowmeter 72, raffinate flowmeter 82, recirculation flowmeter 88, pressure sensors 90–93, and optional outlet valve 69, for backwashing purposes.

Recirculation circuit 84 is provided and includes pump 85, pressure gauges 91 and 92, and flowmeter 88 to monitor the flow therethrough. Recirculation liquid is withdrawn from vessel 52 through recirculation collector 64 and returned to vessel 52 through circulation distributor 60. FIG. 3 illustrates operation with an eluent dome 56 but may be configured with a flat horizontal column top (not shown) without freeboard over the sorbent bed in which case the eluent injection is projected to be in the recirculation circuit 84. The top of sorbent bed 54 may be confined either by a flat, horizontal top (not shown) on vessel 52 or by a hydraulic dome formed as eluent dome 56 which in turn is confined by the upwardly dished head of vessel 52 as shown in FIG. 3. In the preferred, less costly latter case eluent 66 is added to the top of eluent dome 56 whenever the scheduled addition for eluent 66 at that position occurs. Eluent 66 in eluent dome 5 hydraulically pushes the eluent dome interface uniformly throughout its cross-sectional area into the circulating liquid. Circulating liquid from recirculation circuit 84 is continuously injected uniformly into sorbent bed 54 across the cross-section defined by the upper distributor 60.

Figure 4:
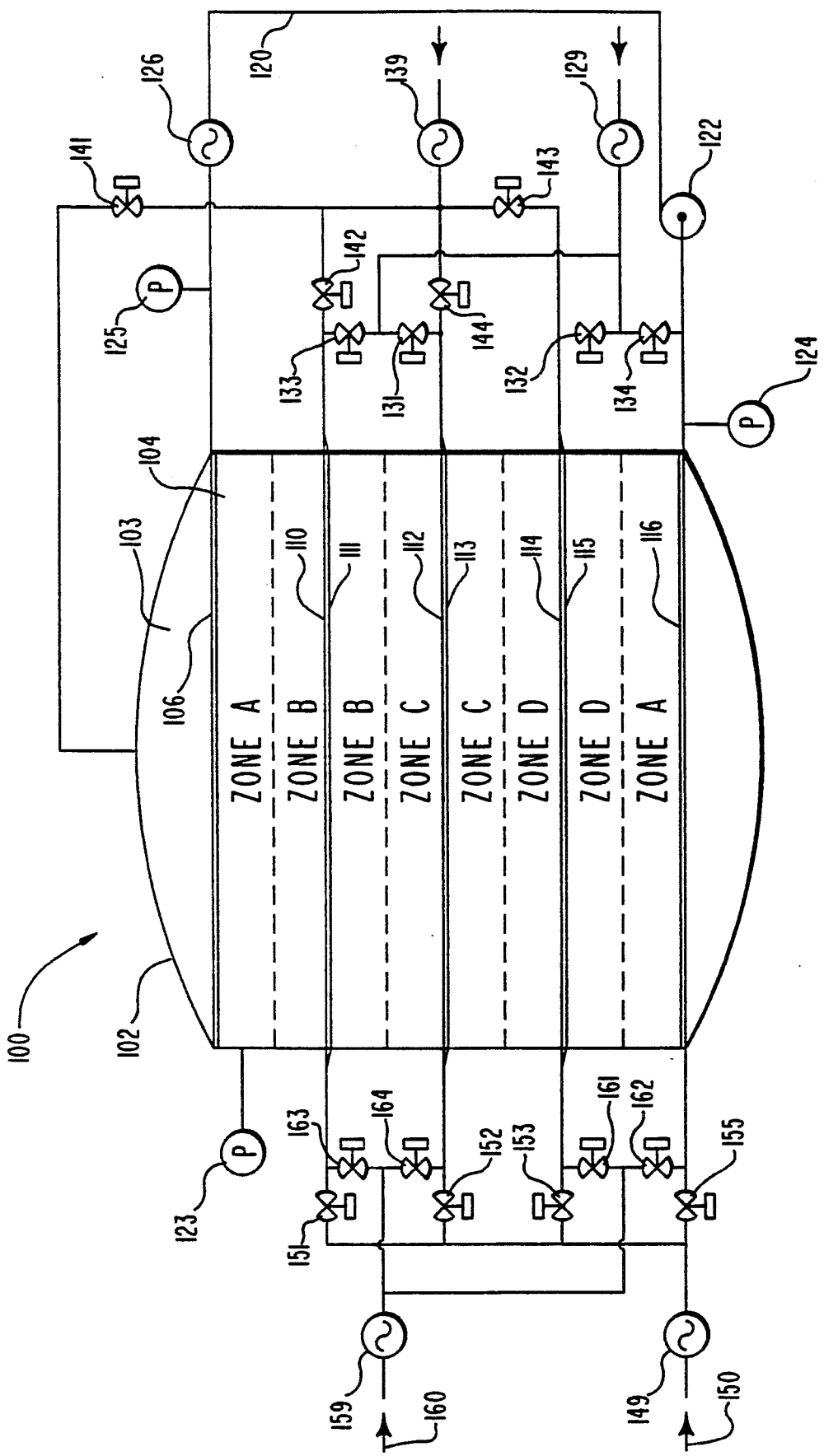
FIG. 4 is a schematic of a third preferred embodiment of the novel process of this invention.

Referring now to FIG. 4, a third preferred embodiment of the concentration apparatus of this invention is shown generally at 100 and includes a vessel 102 having a sorbent bed 104 therein. A plurality of distributor/collectors are interposed across the cross-sectional area of sorbent bed 104 at preselected locations along the longitudinal axis of sorbent bed 104. An upper distributor 106 is placed on the upper surface of sorbent bed 104. Collectors 110, 112, 114 and 116 are uniformly spaced throughout the length of sorbent bed 104 with collector 116 located at the bottom of sorbent bed 104. Collectors 110, 112 and 114 simultaneously serve as distributors. However, for sake of clarity and to facilitate the discussion of their function, these distributors are shown separately and are described as distributors 111, 113 and 115, respectively. A recirculation circuit 120 includes a pump 122, pressure gauges 124 and 125 along with a flowmeter 126. Feedstock 130 enters the circulatory system of apparatus 100 through a flowmeter 129, and the flow thereto regulated by the selective operation of valves 131–134 in cooperation with valves 142 and 144 which also control portions of eluent 140. For example, feedstock 130 is directed to distributor 111 by opening valve 133 while valves 132, 134, 131 and 142 are closed. To direct feedstock 130 into distributor 113, valve 131 is opened while valves 133, 144, 132 and 134 are closed. Similarly, feedstock 130 is directed into distributor 115 by opening valve 132 with valves 131, 133, 134 and 143 closed. Feedstock 130 can also be diverted into the recirculation circuit 120 by opening valve 134 with valves 132, 131, 133 and 141 closed. Feedstock 130 is introduced into recirculation circuit 120 upstream of pump 122 in order to assure thorough mixing of the two streams as they pass through pump 122.

Eluent 140 passes through flowmeter 139 and is then directed to any one of eluent dome 103 or distributors 111, 113 or 115. Eluent 140 is directed into eluent dome 103 by opening valve 141 while keeping valves 142, 144 and 143 closed. Eluent 140 is directed into distributor 111 by opening valve 142 while keeping valves 141, 133, 144 and 143 closed. Correspondingly, eluent 140 is directed into distributor 113 by opening valve 144 with valves 141, 142, 143 and 131 closed. Eluent 140 is directed into distributor 115 by opening valve 143 and keeping valves 141, 142, 144 and 132 closed.

Extract 150 is removed through flowmeter 149 and can be obtained from any one of collectors 110, 112, 114 or 116. From collector 110, extract 150 is removed by opening valve 151 while closing valves 163, 152, 153 and 155. Removal of extract 150 from collector 112 is accomplished by opening valve 152 while closing valves 164, 151, 153 and 155. From collector 114, extract 150 is removed by opening valve 153 while closing valves 161, 151, 152 and 155. Extract 150 is removed from collector 116 by opening valve 155 while closing valves 162, 153, 152 and 151.

Raffinate 160 is removed through flowmeter 159 from any one of collectors 110, 112, 114 or 116. From collector 110, raffinate 160 is removed by opening valve 163 while closing valves 164, 151, 161 and 162. Raffinate 160 is withdrawn from collector 112 by opening valve 164 while closing valves 163, 152, 161 and 162. Raffinate 160 is removed from collector 114 by opening valve 161 while closing valves 153, 162, 163 and 164. Raffinate 160 is removed from collector 116 by opening valve 162 while closing valves 155, 161, 163 and 164.

FIG. 4 comprises the required components according to this invention when operating a single, continuous sorbent bed functioning with dynamic sequencing wherein injections of feedstock and eluent to the circulation fluid and withdrawals of separated fractions from the circulation fluid occur simultaneously within a short period of time from distributors/collectors which progressively change in their respective function. As the profile according to FIG. 2 in the circulation fluid moves continuously at steady state through the sorbent bed the respective injections of eluent and feedstock to the circulation fluid and the withdrawal of separated fractions from the circulation fluid occurs approximately simultaneous through assigned distributions/collectors for a brief period whenever the relevant concentration front travels across the relevant distributor/collector while the circulation fluid continuous downstream. Relevant inlet and outlet valves are opened approximately simultaneously at that time to allow injection of eluent and feedstock through preselected distributors together with the withdrawal of an equivalent portion of the circulation fluid from preselected collectors respectively while the remaining circulating flow continuous uninterrupted but at a somewhat reduced rate during the injection period.

The improvements are applicable to any form of pseudo moving bed separation. Any suitable sorbent material may be used but the preferred material is a uniform, spherical, gel type, noncompressible polystyrenic cation exchanger crosslinked with 6–8% divinylbenzene, a particle size of under 400 microns with a coefficient for particle size variation of less than 10. Variations in the kinetic nature and physical configuration of the sorbent medium will have a decisive impact on the basic circulation flow rate required to maintain a steady state profile. Any suitable sorbents may be used in combination with this invention by adjusting the basic circulation flow, loading and other operating parameters to the specific kinetics, particle size and particle size distribution of the sorbent medium used. When used in ion exclusion such as for the recovery of sucrose from low sugar purity liquors the sorbent medium should preferably be in its ionic potassium form. When used for the chromatographic separation of fructose from fructose/glucose blends the sorbent medium should preferably be in its ionic calcium form. With suitable sorbents the improvements according to this invention may be applied wherever it becomes necessary to separate mixtures into individual components or groups of components. The technique may also be extended to improve the efficiency in ion exchange operations as well.

The following examples ar given to detail the procedure according to this invention for the fractionation of sucrose from impure sugar solutions such as final molasses having sugar purities of about 60% on total dissolved solids or mother liquors from the second crystallization stage of sugar beet liquors with a sugar purity of about 75% on total dissolved solids. Total dissolved solids for the feed syrup is preferably as high as possible but is usually held for practical reasons in the range between 60-75%. Operating temperatures should be sufficiently high to minimize the negative impact of viscosity on pressure drop without significant thermal degradation on system components which suggests a range between 65-85 degrees Celsius. Operating capacities depend somewhat on the sugar purity of the feed syrup and may vary between less than 500 kg to over 700 kg total dissolved solids per cubic meter sorbent medium per day for ion exclusion work. Other conditions imposed on the operation include the ratio of eluent to feed syrup and the raffinate to extract ratio. The sorbent medium in the first example is a polystyrenic gel type cation exchanger in the potassium form, crosslinked with 6% divinylbenzene having a mean particle size of 320 microns with a coefficient of variation for particle size distribution of less than 10. Feed syrup in the first example is the mother liquor from a beet sugar crystallization with a sugar purity of 75% of total dissolved solids, a total dissolved solids content of 70% and a temperature of 80 degrees Celsius for both the feed syrup and the eluent. Feed syrup and eluent are both free of suspended solids which could foul the sorbent bed and contain less than 1% multivalent cations on total cations to prevent fouling of the functional groups. Substantial variations from these conditions may be practiced as long as the operating parameters are stable within narrow tolerances throughout each specific operation.

EXAMPLE 1

Pseudo-moving Bed Operation with a Single Sorbent Bed, Fixed Distributor Functions and Alternate Injection of Feed Syrup and Eluent and Withdrawal of Separated Fractions in a Short Period of Time (FIG. 1)

A vertical column, vessel 12, with an inside diameter of 50 centimeters and height of 490 centimeters was designed as diagrammatically illustrated in FIG. 1. Vessel 12 was uniformly packed with the sorbent medium described above to form sorbent bed 14. Condensate water which was free of dissolved or suspended gases was used as a slurrying agent to transfer the resin until sorbent bed 14 became a noncompressible, uniformly packed sorbent bed that extended from collector 19 to distributor 16. Under these conditions the space occupied by the free water between the sorbent particles represented about 48% of sorbent bed 14 which is the displacement volume in a complete cycle for the movement of the excluded ions and represents the product of circulation flow and total cycle time. The packed column of sorbent bed 14 was first brought to a steady state condition (as reflected by a concentration profile similar to that shown in FIG. 2) by following a series of consecutive steps 1 through 4, outlined below. That profile is than retained and moved continuously through the sorbent bed at steady state by continued cycling of steps 1 through 4.

Step 1: Injecting Eluent and Withdrawing Raffinate During Continued Circulation

Step 1 is arbitrarily defined with the nonsorbed components in Zone D with the most desirable raffinate concentration profile surrounding collector 18 while the condition in Zone A of circulation liquid nearly void of dissolved solids arrives at distributor 16. At this point eluent is introduced through control valve 25 at a flow rate of 17.8 liters per minute for 5 minutes to move eluent liquid uniformly over the entire cross-section of sorbent bed 14 through the interface at distributor 16 while raffinate is withdrawn simultaneously through collector 18 and control valve 27 at an equivalent rate to maintain steady state pressure at the suction of pump 20 as shown by pressure gauge 42. The circulation flow rate as measured at flowmeter 30 is maintained at about 4.4 liters per minute during step 1 by manipulating pump 20.

Step 2: Recycle

At the termination of step 1, control valves 25 and 27 close and a circulation flow of 18.0 liter/minute as measured by flowmeter 30 is maintained during step 2 for a period of about 10 minutes or until the desired extract concentration profile in Zone B surrounds collector 18. A minimum total dissolved solids concentration surrounds distributor 17 in Zone A and a purity equivalent to the feedstock surrounds distributor 16 in Zone C.

Step 3: Injecting Blend and Withdrawing Extract During Continued Circulation

Termination of step 2 and the beginning of step 3 is initiated when the optimum extract concentration in Zone B of the circulation liquid arrives at distributor 18, minimum total dissolved solids are measured in Zone A at distributor 17 and feedstock purity in Zone C surrounds distributor 16. At this point and for a period of 3 minutes feed stock 44 is injected into the circulation liquid at a rate of 5.3 liters per minute through control valve 22 and distributor 16, eluent is injected via control valve 24 and distributor 17 at a rate of 2.1 liters per minute and extract 26 is simultaneously withdrawn via collector 18 and control valve 26 at a rate of about 7.4 liters per minute as measured by flow meter 35. This rate is sufficient to maintain suction pressure for pump 20 at its predetermined level. The recycle flowrate through recirculation circuit 24 during step 3 is maintained at 15 liters per minute.

Step 4: Recycle

At the termination of step 3, control valves 24 and 22 close and the recycle flow rate is increased to 18 liters per minute as measured at flowmeter 30 for a period of 12 minutes or a condition which returns the imaginary zones in sorbent bed 14 to a liquid concentration profile to the same position at the end of step 4 as was evident at the beginning of step 1. The termination of step 4 ends a complete cycle and initiates the beginning of a new cycle with the start of step 1.

When starting with a condition where the sorbent medium in sorbent bed 14 is totally surrounded by water a steady state is reached in about 15 hours following a series of cycled steps 1 through 4. It is possible to arrive in under 6 hours at steady state conditions with certain other manual manipulations.

Results

At steady state operation the sugar purity of the collected extract 30 is about 95% and has a total solids content of about 38% The sugar purity for raffinate 32 is about 11% and has a total solids concentration of about 4%. About 96.5% of the sugar introduced is found in extract 30 which also contains about 15% of the impurities. About 85% of the impurities are found in raffinate 32 which also contains about 3.5% of the sugar introduced.

EXAMPLE 2

Pseudo-moving, Single Bed Separator With Stationary Positions of Inlet and Outlet Points, Simultaneous Introduction of Feedstock and Eluent and Withdrawal of Fractionated Eluents in the Shortest Possible Time. (FIG. 3)

FIG. 3 diagrammatically illustrates another version of a single pseudo moving sorbent bed separator according t this invention. This version is also based on the imaginary division of a single sorbent bed into four basic Zones A, B, C and D and a concentration profile similar to that shown in FIG. 2. The size of sorbent bed 54 and other operating conditions are the same as for Example 1.

Step 1: Injection of Blend and Eluent and Withdrawal of Fractionated Eluents During Continued Circulation Step 1 is initiated with the circulation liquid exhibiting a concentration profile similar to that illustrated in FIG. 1 with the lowest total dissolved solids concentration in Zone A at distributor 60, optimum extract concentration in Zone B at collector 61, feedstock purity in Zone C at distributor 62 and optimum raffinate concentration in Zone D at collector 63. Valves 67, 75, 71 and 81 are opened about the same time to (1) inject eluent 66 into Zone A at a rate of 19.9 liters per minute for 3 minutes through top valve 67 and thereafter for an additional 2 minutes at a rate of 17.8 liters per minute, (2) withdraw extract 74 for 3 minutes from Zone B through collector 61 and valve 75 at a rate of 7.4 liters per minute, (3) inject feedstock 70 for 3 minutes into Zone C through valve 11 and distributor 62 at a rate of 5.3 liters per minute, and (4) withdraw raffinate 80 for 5 minutes at a rate of about 17.8 liters per minute from Zone D through collector 63 and valve 81 to maintain suction pressure for pump 85 at the predetermined level. Pump 85 is manipulated during the first three minutes of step 1 to maintain a circulation flowrate of 5.0 liters per minute as measured at flowmeter 88. Valves 75 and 71 close after 3 minutes into step 1, while valves 67 and 81 remain open for 5 minutes while the circulation flow increases to 7.5 liters per minute during the final 2 minutes of step 1.

Step 2: Recycle

Valves 67 and 81 are closed at the end of step 1 and circulation pump 85 is manipulated to maintain a circulation flowrate of 18.0 liters per minute across flowmeter 88 for a period 25 minutes or until the concentration profile which prevailed at the beginning of step 1 is re-established throughout the sorbent bed.

Results

Overall operating results will be similar to those shown for example 1.

EXAMPLE 3

Pseudo Moving, Single Bed Separator with Simultaneous Injections of Feed Syrup and Eluent and Withdrawals of Separated Fractions using Dynamically Shifting Functions for Respective Distributors and Collectors (FIG. 4)

Example 3 is based on the operation with the design according to this invention illustrated in FIG. 4 and using the basic operating conditions as for Example 1.

Step 1: Injecting Blend and Eluent While Withdrawing Separated Fractions During Continued Circulation With the system at steady state and an optimum concentration profile similar to that illustrated in FIG. 2 established, the beginning of step 1 has been arbitrarily assigned when the circulation liquid surrounding the circulation distributor 106 in Zone A is nearly void of any dissolved substance. At that point the circulation liquid at collector 110 in Zone B is approximately at the highest sugar purity while approximately purity equivalency between the feed syrup in the feedstock 130 and the circulation liquid 120 is reached at distributor 112 in Zone C and the desired composition in raffinate 160 is measured at collector 114 in Zone D. At that point, top valve 141 is opened to inject water at a rate of 15.9 liters per minute, valve 151 at distributor 110 is opened to withdraw 3.8 liters per minute extract 150, valve 131 at distributor 112 is opened to inject 2.65 liters per minute feedstock 130 and valve 161 at distributor 114 is opened to withdraw approximately 14.75 liters per minute raffinate to maintain the hydraulic balance in the loop by controlling the suction pressure at pump 122 in the target range. Pump 122 is manipulated during step 1 to maintain the flow across circulation flowmeter 126 at 6 liters per minute. The duration of step 1 is 1.5 minutes.

Step 2: Recycle

All inlet and outlet valves are closed at the beginning of step 2 while pump 122 is manipulated to maintain for 6 minutes a circulation flowrate across flowmeter 126 of 18.5 liters per minute or until the optimum raffinate concentration in Zone D surrounds collector 116.

Step 3: Injecting Blend and Eluent While Withdrawing Separated Fractions During Continued Circulation Step 3 repeats the flow and time conditions for step 1 with the opening of valve 142 to inject water through distributor 111 at a rate of 15.9 liters per minute, valve 152 is opened to withdraw extract 150 through collector 112 at a rate of 3.8 liters per minute, valve 132 is opened to inject feedstock 130 at a rate of 2.65 liter per minute through distributor 115 and valve 162 is opened to withdraw raffinate through collector 116 at a flowrate of about 14.75 liters per minute to maintain the suction pressure for pump 122 in the preselected range while maintaining a basic circulation flowrate of 6 liters per minute. Step 3 is maintained for 1.5 minutes.

Step 4: Recycle

With all inlet and outlet valves closed step 4 repeats the conditions for step 2 until the sorbent bed profile has moved one position downstream or more precisely until the optimum raffinate concentration in sorbent bed 104 circulation liquid in Zone D surrounds collector 110, the circulation liquid in Zone A is nearly free of dissolved solids and surrounds distributor 112, the highest sugar purity is found in the Zone B of the circulation liquid surrounding collector 114 and nearly equivalent feedstock sugar purity is found in Zone C at collector 116.

Step 5: Injecting Blend and Eluent While Withdrawing Separated Fractions During Continued Circulation The circulation flowrate as measured at flowmeter 126 changes to 20.75 liters per minute during step 5. All other flowrates as well as the step time remain as for step 1 after the concentration profile has moved two positions downstream with Zone D now located at collector 110 and raffinate 160 withdrawn therefrom through valve 163, Zone A around distributor 113 with eluent 140 now entering through valve 144, Zone B surrounding collector 114 and extract 150 withdrawn through collector 114 and valve 153 with Zone C surrounding collector 116 and feedsyrup 130 injected through valve 134 while all other valves are closed.

Step 6: Recycle

Step 6 repeats the flow and time requirements for step 2 to move the sorbent bed profile now three positions downstream from the starting position of step 1 or until the optimum raffinate concentration in Zone D surrounds collector 112, Zone A surrounds distributor 115, Zone B surrounds collector 116 and Zone C with sugar purity in the circulation liquid nearly equivalent to the feedstock now located at distributor 111.

Step 7: Injecting Blend and Eluent While Withdrawing Separated Fractions During Continued Circulation With the circulation profile shifted one position downstream during steps 5 and 6 to position the raffinate Zone D around collector 112, Zone A around distributor 115, Zone B to collector 116 and Zone C to distributor 110 the respective valves 164, 143, 155 and 133 open for 1.5 minutes to deliver the respective flowrates specified for step 1 while maintaining pump 122 suction pressure in the assigned target range. The circulation flowrate measured at flowmeter 126 is controlled at 18.1 liters per minute during step 7 only for the duration of this step which is 1.5 minutes.

Step 8: Recycle

Step 8 is a repeat of step 2 to return the sorbent bed circulation profile to the position it occupied at the beginning of step 1.

Results

At steady state the extract has a sugar purity of 97% and contains about 96.6% of the sugar introduced with the feed syrup while rejecting about 89.8% of the non-sugars to the raffinate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for providing a simulated moving bed process to separate constituents of dissolved solids from a mixture of said dissolved solids by continuous, preferential sorption and desorption comprising:

a vessel for holding a sorbent medium said sorbent medium being uniformly packed in said vessel as a stationary, noncompressible sorbent bed;

liquid distribution means comprising at least a primary distributor being located adjacent the top of said sorbent bed and a secondary distributor being located in about the middle of said sorbent bed;

liquid collection means comprising at least a primary collector being located at the bottom of said sorbent bed and a second collector being located about halfway between said secondary distributor and said primary collector in said sorbent bed;

recirculation means comprising a circulation pump and a conduit external to said sorbent bed to connect said primary collector with said primary distributor to create a loop with said circulation pump providing continuous but variable propulsion means for circulating sorbent bed liquid from said primary collector to said primary distributor and thence through said sorbent bed;

valved manifolding means for selectively introducing measured feedstock and eluent sequentially and cross-sectionally uniform into said circulating sorbent bed liquid at the top of said sorbent bed while withdrawing cross-sectionally uniform and in coordination with said feedstock and said eluent addition to said circulating sorbent bed liquid respective separated sorbed and nonsorbed fractions from said secondary distributor to maintain hydraulic balance within said loop; and control means for selectively controlling said sorbent bed liquid, said eluent, said feedstock, and nonsorbed fraction as a function of time, the displacement volume in said sorbent bed external to said sorbent medium, the kinetics of said sorbent medium and said hydraulic balance to thereby create progressively changing concentration profiles in said circulation sorbent bed liquid through a continuous action o sorption and desorption in said sorbent bed as said circulation sorbent bed liquid passes continuously in a cross-sectionally uniform, perpendicular flow through said sorbent bed from top to bottom with said concentration profiles dynamically and repeatedly ranging from a composition containing primarily diluted nonsorbed components referred to as the displacement zone to progressively change to a mixture of all components to become nearly equivalent to said feedstock referred to as the sorption zone, followed by progressively increasing purity of a desorbed component referred to as the desorption zone, followed by a progressive decline in the total amount of said dissolved solids to a point where said circulation sorbent bed liquid is nearly equivalent to said eluent, referred to as the regeneration zone and where this pattern in said circulation sorbent bed liquid concentration is repeated and maintained through sorption, desorption, periodic addition of feedstock and eluent and coordinated withdrawal of separated fractions at steady state with each cycle.

2. The apparatus defined in claim 1 wherein said control means includes supply means for injecting eluent whereby said eluent is introduced through said secondary distributor to blend cross-sectionally uniform with said circulating sorbent bed liquid moving cross-sectionally uniform and perpendicular downward in said sorbent bed while said feedstock is introduced to said circulating sorbent bed liquid near said primary distributor and said desorbed component is withdrawn cross-sectionally uniform from said secondary collector.

3. The apparatus defined in claim 2 wherein said control means comprises selection means for introducing during a step arbitrarily chosen as first step a predetermined volume of said eluent into that part of said circulation sorbent bed liquid which is most nearly equivalent in composition to said eluent and which has previously been moved to surround said primary distributor of said sorbent bed while simultaneously withdrawing through said secondary collector and cross-sectionally uniform an equivalent volume of an optimum amount of said nonsorbed fraction from said circulation sorbent bed liquid which has previously been moved to a predetermined position all the while maintaining a controlled flowrate for the sorption characteristics of a specific sorbent bed medium, said controlled flowrate being a commensurate flowrate for said circulation sorbent bed liquid by means of said circulating pump as measured in said conduit which connects said primary collector to said primary distributor to maintain the separation between said zones and thereafter closing all inflow and outflow valves to said loop;

said selection means moving immediately during a second step said circulation sorbent bed liquid by means of said circulating pump in said loop and cross-sectionally uniform downward at increased rate commensurate to kinetic properties of said sorbent bed medium and the voidage of said sorbent bed medium to maintain said steady state, dynamic concentration profile in said circulating sorbent bed liquid and said separation between said zones through said sorbent bed as said sorption and said desorption continues through said sorbent bed until the center of said sorption zone in said circulation sorbent bed liquid with a composition most nearly equivalent to said feedstock arrives at said primary distributor while at the same time moving said desorption zone in said circulation sorbent bed liquid with its optimum desorbed component purity and concentration to surround said secondary collector and moving said regeneration zone in said circulation sorbent bed liquid with a composition most nearly equivalent to said eluent to surround said secondary distributor;

said selection means injecting during a third step a predetermined volume of said feedstock to be acted upon in the shortest possible time and cross-sectionally uniform through said primary distributor into said circulating sorbent bed liquid, while simultaneously injecting a predetermined volume of said eluent cross-sectionally uniform through said secondary distributor into said circulation sorbent bed liquid all the while withdrawing cross-sectionally uniform an equivalent volume from said circulation sorbent bed liquid which contains an optimum desorbed component purity fraction through said secondary collector to maintain said hydraulic balance in said loop while maintaining said circulation sorbent bed liquid flow commensurate to the specific sorbent medium used to advance the front of said sorption zone no faster than the rate of said sorption and said desorption permits by means of said circulation pump to maintain separation of said zones at steady state, thereafter closing all inflow and outflow valves attached to said loop to proceed with a fourth step; and said selection means repeating the conditions for said second step during said fourth step until an optimum eluent composition in said regeneration zone arrives at said primary distributor while moving at the same time said optimum nonsorbed component fraction in said circulation sorbent bed liquid to surround said secondary collector to complete the cycle and repeating said cycle in a continuous fashion.

4. The apparatus defined in claim 1 wherein said control means comprises a distribution means for distributing said dynamic concentration profile over more than one said sorbent bed.

5. The apparatus defined in claim 1 wherein said valved manifolding means includes arrangements to collect more than two said separated fractions.

6. The apparatus defined in claim 1 wherein said feedstock is an impure sugar solution and wherein the sorbent medium is a polystyrenic cation exchanger crosslinked with less than 10% divinylbenzene, sulfonic acid functionality, operating in the potassium form and having uniform spherical particle size of less than 450 micron.

7. The apparatus defined in claim 1 wherein the feedstock is a mixture of monosaccharides and wherein the sorbent medium is a polystyrenic cation exchanger crosslinked with less than 10% divinylbenzene, sulfonic acid functionality, operating in the calcium form and having a uniform spherical particle size of less than 450 micron.

8. The apparatus defined in claim 1 wherein the eluent is clean water free of ionic material which would interfere with the respective sorption capacity of the sorbent medium.

9. An apparatus for providing a simulated moving bed process to separate components from a mixture of dissolved solids in a feedstock by continuous preferential sorption and desorption comprising:

a vessel for holding a sorbent medium, said sorbent medium being uniformly packed in said vessel as a stationary, noncompressible sorbent bed;

liquid distribution mans comprising at least a primary distributor being located adjacent the top of said sorbent bed and a secondary distributor being located in about the middle of said sorbent bed;

liquid collection means comprising at least a primary collector being located at the bottom of said sorbent bed and a secondary collector being located about halfway between said primary distributor adjacent the top of said sorbent bed and said secondary distributor in said sorbent bed and a third collector located about halfway between said secondary distributor in said sorbent bed and said primary collector for said sorbent bed;

recirculation means comprising a circulation pump and a conduit external to said sorbent bed to connect said primary collector with said primary distributor to create a loop with said circulation pump providing continuous but variable propulsion means for circulating sorbent bed fluid from said primary collector to said primary distributor and thence through said sorbent bed;

valved manifolding means for introducing:
measured eluent cross-sectionally uniform into said circulating fluid adjacent the top of said sorbent bed; and
measured feedstock cross-sectionally uniform into said circulating fluid moving through said sorbent bed by means of said secondary distributor;

removal means for withdrawing cross-sectionally uniform and in coordination with respective said feedstock and said eluent addition to said circulating fluid the desorbed component fractions from said secondary collector and the nonsorbed component fraction from said third collector to maintain hydraulic balance within said loop;

control means for selectively controlling said feedstock, said eluent, said desorbed component fractions, said nonsorbed component fractions, and said circulating fluid as a function of time, the displacement volume in said sorbent bed external to said sorbent medium, the kinetics of said sorbent medium, and said hydraulic balance to thereby create dynamically changing but progressively moving and repeating concentration profiles in said circulation fluid through a continuous action of said sorption and said desorption in said sorbent bed as said circulation fluid passes continuously in a cross-sectionally uniform, perpendicular flow through said sorbent bed from top to bottom with said concentration profiles ranging from a composition containing primarily diluted nonsorbed components referred to as the displacement zone to progressively change to become nearly equivalent to said feedstock referred to as the sorption zone, followed by progressively increasing purity of said desorbed component fractions referred to as the desorption zone, followed by a progressive decline in total quantity of said dissolved solids to a point where said circulation fluid is nearly equivalent to said eluent, referred to as the regeneration zone and where this pattern in said circulation fluid concentration thereby established is repeated through periodic addition of feedstock and eluent and coordinated withdrawal of separated fractions at steady state with each cycle.

10. The apparatus defined in claim 9 wherein said control means comprises selection means for introducing cross-sectionally uniform and in the shortest possible time during a step arbitrarily designated as a first step a predetermined volume of said eluent which is commensurate to said kinetic and hydraulic properties for said sorbent medium and said sorbent bed, through said primary distributor into said circulation fluid which is in that position most nearly equivalent to said eluent from a preceding step while also introducing in the shortest possible time through said secondary distributor and cross-sectionally uniform a predetermined quantity of said feedstock fluid which is commensurate to said kinetic and hydraulic properties for said sorbent medium and said sorbent bed, into said circulation fluid which in that position is most nearly equivalent in composition to said feedstock from the preceding step, while also withdrawing a predetermined volume of separated desorbed fraction through said secondary collector cross-sectionally uniform from its optimum concentration in said circulation fluid positioned thereto in the preceding step and withdrawing all the while and cross-sectionally uniform through said third collector from said circulation fluid a measured volume of an optimum nonsorbed fraction positioned thereto in the preceding step to preserve hydraulic balance in said loop while all the time maintaining a controlled but for the specific sorbent medium and sorbent bed commensurate forward flowrate for said circulation fluid by means of said circulating pump to continue uninterrupted, forward moving action of said sorption and desorption respectively throughout said sorbent bed to maintain said dynamically changing concentration profile within said circulation fluid and separation between said zones and thereafter closing all inflow and outflow valves attached to said loop and thence proceeding immediately with a second step by;

said selection means moving said circulation fluid at an increased flowrate by means of said circulating pump in said loop and cross-sectionally uniform downward flow through said sorbent bed at a rate commensurate to said kinetic and said hydraulic properties for said sorbent medium and said sorbent bed to maintain said steady state, dynamic concentration profile in said circulating fluid and the separation between said zones through said sorbent bed as said sorption and said desorption continues progressively forward throughout said sorbent bed until said dynamic concentration profile in said circulation fluid is positioned to place near eluent composition in said circulation fluid at said primary distributor, near said feedstock composition in said circulation fluid at said secondary distributor, said optimum desorbed fraction concentration in said circulation fluid at said secondary collector and said optimum nonsorbed fraction in said circulation fluid at said third collector and to repeat this pattern continuously.

11. The apparatus defined in claim 9 wherein said control means comprises distribution means for distributing said dynamic concentration profile over more than one said sorbent bed.

12. The apparatus defined in claim 9 wherein said liquid collection means includes arrangement to collect more than two said separated fractions.

13. The apparatus defined in claim 9 wherein said feedstock is an impure sugar solution and wherein the sorbent medium is a polystyrenic cation exchanger crosslinked with less than 10% divinylbenzene, sulfonic acid functionality, operating in the potassium form and having uniform spherical particle size of less than 450 micron.

14. The apparatus defined in claim 9 wherein the feedstock is a mixture of monosaccharides and wherein the sorbent medium is a polystyrenic cation exchanger crosslinked with less than 10% divinylbenzene, sulfonic acid functionality, operating in the calcium form and having a uniform spherical particle size of less than 450 micron.

15. The apparatus defined in claim 9 wherein the eluent is clean water free of ionic material which would interfere with the respective sorption capacity of the sorbent medium.

16. An apparatus for providing a simulated moving bed process to separate components form a mixture of dissolved solids by continuous preferential sorption and desorption comprising;
 a vessel for holding a sorbent medium said sorbent medium being uniformly packed in said vessel as a stationary, noncompressible sorbent bed;
 liquid distribution means comprising at least a primary distributor being located adjacent the top of said sorbent bed and a secondary distributor being located in about the middle of said sorbent bed;
 liquid collection means comprising at least a primary collector being located at the bottom of said sorbent bed, a secondary collector being located about halfway between said primary distributor for said sorbent bed and said secondary distributor in said sorbent bed and a third collector located about halfway between said secondary distributor in said sorbent bed and said primary collector for said sorbent bed;
 recirculation means comprising a circulation pump and a conduit external to said sorbent bed to connect said primary collector with said primary distributor to create a loop with said circulation pump providing continuous but variable propulsion means for circulating sorbent bed fluid from said primary collector to said primary distributor and thence through said sorbent bed;
 valved manifolding means for introducing:
 measured eluent cross-sectionally uniform into said circulating fluid moving through said sorbent bed by means of said primary distributor, said secondary distributor, said secondary collector and said third collector respectively; and
 measured feedstock cross-sectionally uniform into said circulating fluid moving through said sorbent bed by means of said primary distributor, said secondary distributor, said secondary collector and said third collector respectively;

withdrawing cross-sectionally uniform from said circulating fluid measured quantities of a desorbed fraction through said primary collector, said secondary collector, said third collector and said secondary distributor and withdrawing cross-sectionally uniform measured quantities of a nonsorbed fraction from said circulating fluid through said primary collector, said secondary collector, said third collector and said secondary distributor respectively to maintain hydraulic balance within said loop;

control means for selectively controlling all of said feedstock, said eluent, said desorbed fraction, said nonsorbed fraction, and said circulation fluid as a function of time, the displacement volume in said sorbent bed external to said sorbent medium, the kinetics of said sorbent medium, and hydraulic properties for said sorbent bed to thereby create dynamic concentration profiles in said circulation fluid through continuous action of said sorption and said desorption in said sorbent bed as said circulation fluid passes continuously but at a variable rate in a cross-sectionally uniform, perpendicular flow through said sorbent bed from top to bottom with said concentration profiles dynamically and repeatedly ranging from a composition containing primarily diluted nonsorbed components, referred to as the displacement zone to dynamically change to become nearly equivalent to said feedstock referred to as the sorption zone, followed by dynamically increasing purity of said desorbed component, referred to as the desorbtion zone, followed by a progressive decline in total quantity of said dissolved solids to a point where said circulation fluid is nearly equivalent to said eluent, referred to as the regeneration zone and where this pattern in said circulation fluid concentration thusly established is repeated at steady state through periodic addition of said feedstock and said eluent, coordinated withdrawal of said desorbed fraction and said nonsorbed fraction and the dynamic action of said sorption and desorption within and throughout said sorbent bed with each cycle.

17. The apparatus defined in claim 16 wherein said control means comprises selection means for introducing cross-sectionally uniform and in the shortest possible time during a step arbitrarily designated as a first step a predetermined volume of said eluent which is commensurate to said kinetic and hydraulic properties for said sorbent medium and said sorbent bed, through said primary distributor into said circulation fluid which is in that position most nearly equivalent to said eluent from a preceding step, while also introducing in the shortest possible time through said secondary distributor and cross-sectionally uniform a predetermined quantity of said feedstock fluid which is commensurate to said kinetic and hydraulic properties for said sorbent medium and said sorbent bed, into said circulation fluid which in that position is most nearly equivalent in composition to said feedstock from the preceding step, while also withdrawing a predetermined volume of separated desorbed fraction through said secondary collector cross-sectionally uniform form its optimum concentration in said circulation fluid positioned thereto in the preceding step and, withdrawing all the while and cross-sectionally uniform through said third collector form said circulation fluid a measured volume of an optimum nonsorbed fraction positioned thereto in the preceding step to preserve hydraulic balance in said loop while all the time maintaining a controlled but for the specific sorbent medium and sorbent bed commensurate forward flowrate for said circulation fluid by means of said circulating pump to continue uninterrupted, forward moving action of said sorption and desorption respectively throughout said sorbent bed to maintain said dynamically changing concentration profile within said circulation fluid and separation between said zones and thereafter closing all inflow and outflow valves attached to said loop and thence proceeding immediately with a second step by;

said circulation pump moving said circulation fluid at increased flowrate in said loop and cross-sectionally uniform downward flow through said sorbent bed at a rate commensurate to said kinetic and said hydraulic properties for said sorbent medium and said sorbent bed to maintain said steady state, dynamic concentration profile in said circulating fluid and the separation between said zones through said sorbent bed as said sorption and said desorption continues progressively forward throughout said sorbent bed until said dynamic concentration profile in said circulation fluid is positioned to place near eluent composition in said circulation fluid at said secondary collector, near said feedstock composition in said circulating fluid at said third collector, said optimum desorbed fraction concentration in said circulating fluid at said secondary distributor and said optimum nonsorbed fraction in said circulation fluid at said primary collector thereafter proceeding immediately with a third step;

said selection means being operable to repeat the first step as designated third step except said eluent is injected into said circulating fluid through said secondary collector only, said feedstock is injected into said circulating fluid through said third collector only, said optimum desorbed fraction in said circulating fluid is withdrawn through said secondary distributor only and said optimum nonsorbed fraction in said circulation fluid is withdrawn through said primary collector only and immediately thereafter closing all inflow and outflow valves attached to said loop manifolding to proceed immediately with the fourth step;

said selection means repeating the second step as designated fourth step until an optimum eluent concentration in said circulation fluid arrives at said secondary distributor, said equivalent feedstock composition is positioned at said primary distributor, said optimum desorbed fraction in said circulation fluid arrives at said third collector and said optimum nonsorbed fraction in said circulation fluid arrives at said secondary collector and thereafter;

said selection means repeating said first step as designated fifth step except said eluent is injected into said circulating fluid through said second distributor only, said feedstock is injected into said circulating fluid through said primary distributor only, said optimum desorbed fraction in said circulating fluid is withdrawn through said third collector only and said optimum nonsorbed fraction in said circulation fluid is withdrawn through said secondary collector only and thereafter closing all inflow and outflow valves attached to said loop to proceed immediately with the sixth step;

said selection means repeating the second step as designated sixth step until said optimum eluent composition in said circulation fluid arrives at said third collector, said optimum feedstock composition in said circulation fluid arrives at said secondary collector, said optimum desorbed fraction in said circulation fluid arrives at said primary collector and said optimum nonsorbed fraction in said circulation fluid arrives at said secondary distributor and immediately thereafter;

said selection means repeating the first step as designated seventh step except said eluent is injected into said circulating fluid through said third collector only, said feedstock is injected into said circulating fluid through said secondary collector only, said optimum desorbed fraction in said circulating fluid is withdrawn through said primary collector only and said optimum nonsorbed fraction in said circulating fluid is withdrawn through said secondary distributor only and thereafter closing all inflow and outflow vales attached to said loop to proceed immediately with the eighth step; and repeating the second step as designated eighth step until said circulation is returned to the position identified as the beginning of the first step to repeat the cycle in a continuous fashion of steady state operation.

18. The apparatus defined in claim 16 wherein said liquid distribution means comprises a plurality of liquid distribution means for distributing said dynamic concentration profile over more than one said sorbent bed.

19. The apparatus defined in claim 16 wherein said liquid collection means includes arrangements to collect more than two said separated fractions.

20. The apparatus defined in claim 16 wherein said feedstock is an impure sugar solution and wherein the sorbent medium is a polystyrenic cation exchanger crosslinked with less than 10% divinylbenzene, sulfonic acid functionality operating in the potassium form and having uniform spherical particle size of less than 450 micron.

21. The apparatus defined in claim 16 wherein the feedstock is a mixture of monosaccharides and wherein the sorbent medium is a polystyrenic cation exchanger crosslinked with less than 10% divinylbenzene, sulfonic acid functionality, operating in the calcium form and having a uniform spherical particle size of less than 450 micron.

22. The apparatus defined in claim 16 wherein the eluent is clean water free of ionic material which would interfere with the respective sorption capacity of the sorbent medium.

* * * * *